United States Patent [19]

Hanak

[11] 4,027,192

[45] May 31, 1977

[54] ELECTROLUMINESCENT DEVICE COMPRISING ELECTROLUMINESCENT LAYER CONTAINING INDIUM OXIDE AND/OR TIN OXIDE

[75] Inventor: Joseph John Hanak, Lawrenceville, N.J.

[73] Assignee: RCA Corporation, New York, N.Y.

[22] Filed: July 18, 1975

[21] Appl. No.: 597,215

[52] U.S. Cl. .................. 313/498; 252/301.4 R; 313/468; 313/503; 313/506
[51] Int. Cl.$^2$ .................................... H01J 1/62
[58] Field of Search ............ 252/301.4 R; 313/468, 313/498, 502, 503, 506, 509

[56] References Cited

UNITED STATES PATENTS

| | | | |
|---|---|---|---|
| 2,880,346 | 3/1959 | Nicoll et al. | 313/506 |
| 3,470,411 | 9/1969 | Ozawa et al. | 313/468 |
| 3,649,553 | 3/1972 | Tanaka et al. | 313/502 X |

Primary Examiner—Rudolph V. Rolinec
Assistant Examiner—Lawrence J. Dahl
Attorney, Agent, or Firm—G. H. Bruestle; L. Greenspan

[57] ABSTRACT

The device comprises an electroluminescent layer and means for exciting the electroluminescent layer to luminescence with an electric field. The electroluminescent layer comprises a cathodoluminescent phosphor normally having a bulk resistivity greater than $10^{11}$ ohm-centimeters containing a sufficient quantity of indium oxide and/or tin oxide therein to produce a bulk resistivity of less than $10^{10}$ ohm-centimeters in the electroluminescent layer. The preferred electroluminescent layers are red emitting solid solutions of yttrium oxide, europium oxide, and indium oxide which are prepared by radio frequency sputtering.

10 Claims, 4 Drawing Figures

ELECTROLUMINESCENT DEVICE COMPRISING ELECTROLUMINESCENT LAYER CONTAINING INDIUM OXIDE AND/OR TIN OXIDE

BACKGROUND OF THE INVENTION

This invention relates to a novel electroluminescent device.

Cathodoluminescent phosphors are known to be efficient light emitters when excited with electrons. Many of them are extremely insulating, having a resistivity greater than $10^{11}$ ohm-centimeters and are therefore poor light emitters when excited with an electric field. For example, europium-activated yttrium oxide, which is known to be a rather efficient cathodoluminescent material has a resistivity substantially greater than $10^{11}$ ohm-centimeters. As used herein, resistivity is measured on the bulk material with a current density of 2 milliamperes per square centimeter ($mA/cm^2$).

In a search for new red emitting electroluminescent materials, electroluminescent films of this oxide were made by radio frequency sputtering on glass substrates coated with a transparent conductive coating. The electroluminescent films, which were about 1500 Angstroms thick, exhibited strong red cathodoluminescence. The films were then coated with a resistive cermet film consisting of a sputtered film about 2 micrometers thick of silica containing about 10 volume percent of nickel metal. Aluminum metal electrodes were then sputtered upon the cermet film. When a dc voltage was applied to the yttrium oxide film, a dim red electroluminescence was observed. Brightnesses of about 3 foot lamberts were obtained, apparently because the films were electrically insulating and relatively small currents could be passed through the film before its dielectric breakdown. Higher conductivity in the luminescent film is apparently necessary to increase the current through the film and to increase the brightness therefrom.

SUMMARY OF THE INVENTION

The novel device is similar in structure to the above-described prior device except that sufficient indium oxide and/or tin oxide is present in the cathodoluminescent phosphor to reduce the bulk resistivity of the layer from about $10^{11}$ ohm-centimeters to below $10^{10}$ ohm-centimeters an preferably to about $10^8$ to $10^9$ ohm-centimeters. The effect is to increase the luminescence which is obtained from the layer upon excitation with dc, pulsed dc, and ac electric fields. The electroluminescent layers are cathodoluminescent phosphors having a bulk electrical resistivity greater than $10^{11}$ ohm-centimeter and having indium oxide and/or tin oxide therein which reduces the bulk resistivity to less than $10^{10}$ ohm-centimeters. The preferred electroluminescent layers are solid solutions of yttrium oxide, europium oxide, and indium oxide.

DETAILED DESCRIPTION OF THE INVENTION

Figure 1:
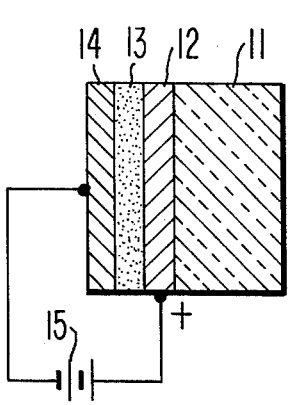
FIGS. 1 and 2 are cross sectional views of dc electroluminescent cells of the invention.

FIG. 1 is a cross sectional view of a suitable dc electroluminescent cell of the invention. The cell comprises a glass substrate 11 having a transparent conductive coating of indium oxide 12 thereon, a sputtered electroluminescent layer 13 thereon, and an evaporated aluminum metal electrode 14 upon the electroluminescent layer. The transparent conductive coating 12 which acts as a first electrode and the metal electrode 14 which acts as the second electrode are connected to a dc source 15 which provides the power for operating the cell. When the power is turned on and the threshold voltage has been reached, electroluminescence is observed. through the substrate 11.

Figure 2:
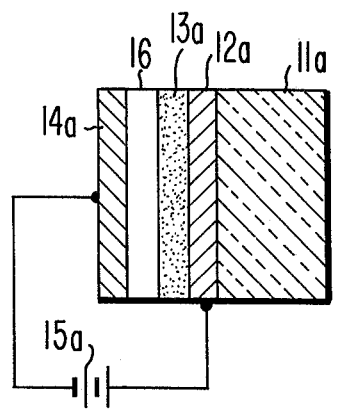

FIG. 2 is similar in structure, and similar reference numerals are used for similar structures, to the cell of FIG. 1 except that a resistive layer 16 for limiting the maximum current flow through the device is interposed between the electroluminescent layer 13 and the second electrode 14. The resistive layer 16 serves as a ballast resistor or current-limiting resistor for each incremental area of the electroluminescent layer 13, should the current flow attempt to concentrate in a localized area of the layer 13. The resisitive layer 16 may be any composition, but is preferably a cermet of nickel metal and silicon oxide in such proportions as to provide the desired conductivity and thickness.

Figure 3:
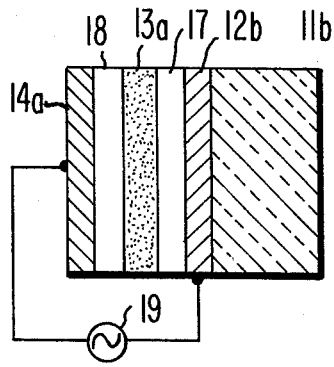
FIG. 3 is a cross sectional view of an ac electroluminescent cell of the invention.

FIG. 3 is similar in structure, and similar reference numerals are used for similar structures, to the cell of FIG. 1 except that insulating layers 17 and 18 are located on both sides of the electroluminescent layer 13. Also, an ac voltage source 19 is substituted for the dc voltage source 15. Preferably, the ac voltage source provides an electric field with frequencies in the range of about 1–5 kilohertz.

The insulating layers 17 and 18 may be of any composition having a high breakdown field, but are preferably a homogeneous material such as yttrium oxide or aluminum oxide. Such insulating layers may be produced by radio frequency sputtering or vapor deposition as is known in the art. A ballast resistor layer (not shown) may also be included between the insulating layer 18 and the second electrode 14a.

The electroluminescent layer may be prepared by radio frequency sputtering. In the preferred sputtering method, a single multi-component target is produced and is sputtered onto a substrate in an inert atmosphere at temperatures from about 260° to 525° C for soda-lime glass substrates. The electroluminescent layer is a homogeneous mixture of indium oxide and/or tin oxide in a cathodoluminescent phosphor having a resistivity greater than $10^{11}$ ohm-centimeters. The effect of incorporating the indium oxide and/or tin oxide in the phosphor is to lower the resistivity of the phosphor. Phosphors which have resistivities below $10^{10}$ ohm-centimeters, and preferably about $10^8$ to $10^9$ ohm-centimeters, are well adapted for electric field excitation. A preferred family of red-emitting phosphors contain, per 100 mol parts of phosphor 11 to 92 mol parts of yttrium oxide,
7 to 75 mol parts of indium oxide and
1 to 14 mol parts of europium oxide.

The preferred range for dc field excitation and for pulse dc field excitation is:

25 to 83 mol parts of yttrium oxide,
15 to 65 mol parts of indium oxide and
2 to 10 mol parts of europium oxide.

The preferred compositional range for ac field excitation is:
  60 to 91 mol parts of yttrium oxide,
  7 to 30 mol parts of indium oxide and
  2 to 10 mol parts of europium oxide.

Tin oxide, preferably in the form of $SnO_2$, may be substituted mol-for-mol for indium oxide in the above compositions. Lanthanum and/or gadolinium can be substituted in whole or in part of yttrium. Other host materials can be vanadates, oxysulfides and phosphates of yttrium, gadolinium and/or lanthanum. Still other host materials can be zinc silicate, zinc aluminate, zinc phosphate and strontium phosphate. Any of these host materials may contain activators known in the art to produce cathodoluminescence in the host material. Some examples of activators are Pr, Nd, Sm, Eu, Tb, Dy, Ho, Er, Tm, and Mn.

The nature and structure of the substrate upon which the electroluminescent layer is deposited is not critical and depends in part upon the application to which the electroluminescent device will be applied. For the preparation of the electroluminescent devices, plates of glass of fused silica or other transparent refractory substrate is coated with a transparent conductive film, such as a film of indium oxide or tin oxide. The substrate is mounted above and parallel to the target used in sputtering. The substrate can be held in a fixed position and can be oscillated during radio frequency sputtering to improve the layer uniformity, if desired.

The substrate is heated within the temperature range of about 260° to 525° C, preferably about 425° to 500° C during sputtering. The temperature of the substrate affects the rate of deposition of the constituents and thus must be closely controlled to obtain films of constant composition. The voltage applied during sputtering should be kept substantially constant in order to obtain films of constant composition. By voltage is meant the dc sheet voltage which develops at the target during radio frequency sputtering. The voltage applied will depend upon the equipment employed but a wide variation in voltage during sputtering would result in changes of the composition of the sputtered film. During sputtering an atmosphere comprising a mixture of oxygen and an inert gas such as argon or neon is maintained at a total pressure of about 10 to 15 militorr. The oxygen content may vary from about 5 to 100 percent by volume (preferably about 10 volume percent) of the atmosphere.

The above conditions will provide sputtered electroluminescent films of nearly constant composition at the rate of about 30 to 200 angstroms per minute. Sputtering is continued until a film of the desired thickness is obtained. Films suitable for display devices are from about 0.2 to 3.0 microns thick, preferably about 0.2 to 2 microns thick. In general electroluminescent brightness increases with increasing thickness of the film throughout the preferred range, when optimum operating voltages are employed.

EXAMPLE

To produce the device shown in FIG. 2, a glass substrate measuring 10 centimeters by 10 centimeters by 0.16 centimeters was coated on one side with an indium oxide conducting, transparent film. Such coated glass substrates are available commercially. A mixture of about 71 mol percent of yttrium oxide, about 20 mol percent of indium oxide and about 9 mol percent of europium oxide powders in the desired proportion was pressed into a composite target and then radio frequency sputtered in an atmosphere of 90 percent argon and 10 percent oxygen at a pressure of about 10 militorr and with the glass substrate at a temperature of about 450° to 500° C. The resultant electroluminescent film 13a was then coated with a 2 micrometer thick sputtered cermet film of nickel metal and silica which contained about 10 volume percent of nickel metal to serve as a current limiting resistive film. A square array of 0.2 micrometers thick aluminum electrodes, 0.16 by 0.16 centimeters in size on 0.25 centimeters centers, was deposited on the resistive layer 16.

Figure 4:
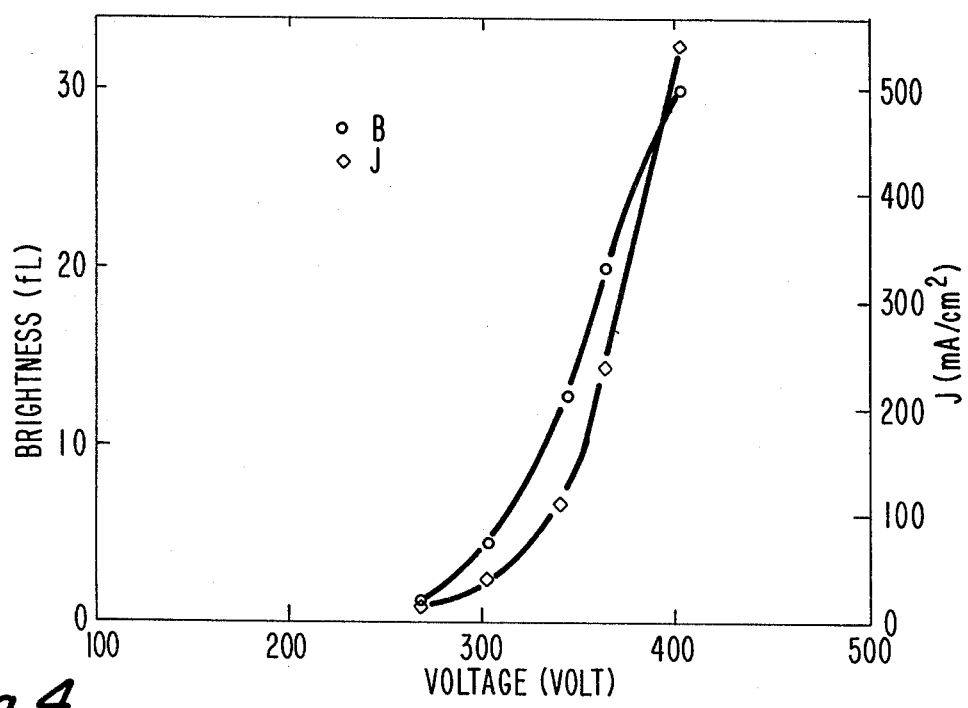
FIG. 4 is a graph of the brightness as a function of applied voltage for a particular electroluminescent layer in a device of the invention.

The electroluminescent layer 13a was about 0.2 micrometers thick. When excited with pulsed dc pulses about 12 microseconds wide at a repetition rate of about 480 microseconds, red electroluminescence was observed through the substrate 11a. A maximum brightness of over 30 foot-lamberts and a maximum power efficiency of about $3 \times 10^{-5}$ watts output/watt input were observed. The resistivity of the electroluminescent layer 13a varied from about $10^9$ down to about $10^7$ ohm-centimeters in the range of voltage in which the electroluminescence was observed. The threshold field at which electroluminescence appeared was of the order of $3 \times 10^6$ volts per centimeter. FIG. 4 is a graph of the brightness as a function of voltage and the current density J as a function of voltage for the above composition which was 9 mol percent of europium oxide, 20 mol percent of indium oxide and 71 mol percent of yttrium oxide. The nonlinearity observed in both curves is similar to electroluminescent cells employing zinc sulfide electroluminescent layers.

As the indium oxide content of the electroluminescent layer increases above 20 mol percent, the power efficiency decreases, but the cell half life increases by several orders of magnitude. Half life is defined herein as the time elapsed for the power efficiency to degrade to one-half its maximum value. The variation of half life, taken over several decades with composition in unexpected, since this variation in power efficiency necessitates higher power input, which normally accelerates cell degradation.

Below about 30 mol percent of indium oxide, red electroluminescence appeared instantly upon application of a sufficiently high voltage. At greater indium oxide concentrations, electroluminescence appeared after a period of forming.

Additional electroluminescent cells were prepared varying the indium oxide content, to vary several electrical parameters of the cells.

As the indium oxide content was varied from about 20 to 73 mol parts of the layer, resistivity measured at a current density of 2 mA/cm$^2$ was found to vary from about $10^9$ to about $10^5$ ohm-centimeters.

The emission spectra for all compositions excited with ultraviolet light, cathode rays and electric fields were substantially identical, being typical of trivalent europium emission which exhibits a large peak at about 613.0 nanometers. The intensity of the 613.0 nanometer peak varied somewhat with composition.

I claim:

1. An electroluminescent device comprising (a) a homogeneous electroluminescent layer consisting essentially of a solid solution of a cathodoluminescent phosphor normally having a bulk electrical resistivity greater than $10^{11}$ ohm-centimeters and a quantity of at least one member of the group consisting of indium oxide and tin oxide, said quantity being effective to reduce the bulk resistivity of said layer to less than $10^{10}$ ohm-centimeters, and means for exciting said electroluminescent layer to luminescence with an electric field.

2. The device defined in claim 1 wherein said phosphor has only indium oxide therein.

3. The device defined in claim 1 wherein said phosphor has only tin oxide therein.

4. The device defined in claim 1 wherein said means includes a first transparent electrode on one side of said layer, a resistive layer for limiting the maximum current flow through said device contacting the other side of said electroluminescent layer and a second electrode contacting said resistive layer.

5. The device defined in claim 1 wherein said electroluminescent layer is produced by a radio frequency sputtering method.

6. The device defined in claim 1 wherein said solid solution contains, per 100 mol parts of solution, about 11 to 92 mol parts of yttrium oxide, 7 to 75 mol parts of indium oxide and 1 to 14 mol parts or europium oxide.

7. An electroluminescent device comprising (a) a homogeneous electroluminescent layer consisting essentially of a solid solution of yttrium oxide, indium oxide, and europium oxide said solid solution containing, per 100 mol parts of solution, about 25 to 91 mol parts of yttrium oxide, 7 to 65 mol parts of indium oxide, and 2 to 10 mol parts of europium oxide. said layer having a bulk resistivity of less than $10^{10}$ ohm-centimeters and (b) means for exciting said layer to luminescence with an electric field.

8. The device defined in claim 7 wherein said solid solution contains, per 100 mol parts of solution about 25 to 83 mol parts of yttrium oxide, 15 to 65 mol parts ofindium oxide and 2 to 10 mol parts of europium oxide.

9. The device defined in claim 7 wherein said solid solution contains, per 100 mol parts of solution, about 60 to 91 mols parts of yttrium oxide, 7 to 30 mol parts of indium oxide and 2 to 10 mol parts of europium oxide.

10. The device defined in claim 9 wherein said solid solution contains, per 100 mol parts of solution, about 76 mol parts of yttrium oxide, about 15 mol parts of indium oxide and about 9 mol parts of europium oxide, an insulating layer adjacent to both sides of said solid solution layer and said electric field is an ac electric field with frequencies in the range of about 1 to 5 kilohertz.

* * * * *

UNITED STATES PATENT OFFICE
CERTIFICATE OF CORRECTION

PATENT NO. : 4,027,192
DATED : May 31, 1977
INVENTOR(S) : Joseph John Hanak

It is certified that error appears in the above-identified patent and that said Letters Patent are hereby corrected as shown below:

Column 1, line 48    change "an" to --and--

Column 3, line 9    change "of" to --for--

Column 4, line 39    change "in" to --is--

Column 5, line 2    insert "(b)" before "means"

Signed and Sealed this twenty-third Day of August 1977

[SEAL]

Attest:

RUTH C. MASON
*Attesting Officer*

C. MARSHALL DANN
*Commissioner of Patents and Trademarks*